Jan. 11, 1966                  C. E. MAIER                3,228,222
METHOD AND APPARATUS FOR THE EXPLOSION FORMING
OF HOLLOW OBJECTS, INCLUDING SUCH CONTAINER
ELEMENTS AS CUPS, CANS, CAN ENDS
Filed April 25, 1962                                4 Sheets-Sheet 4
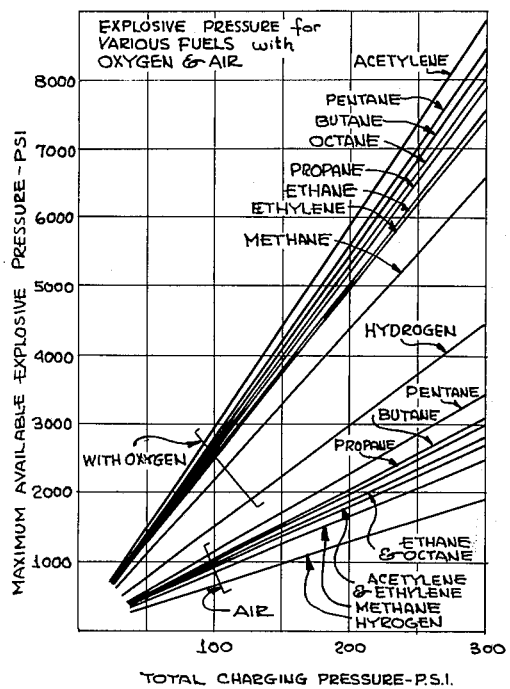
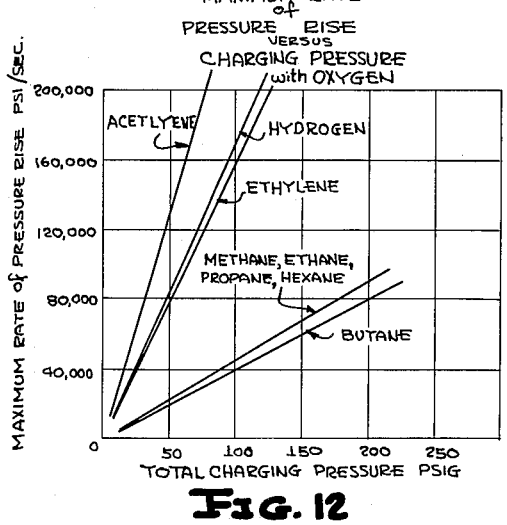
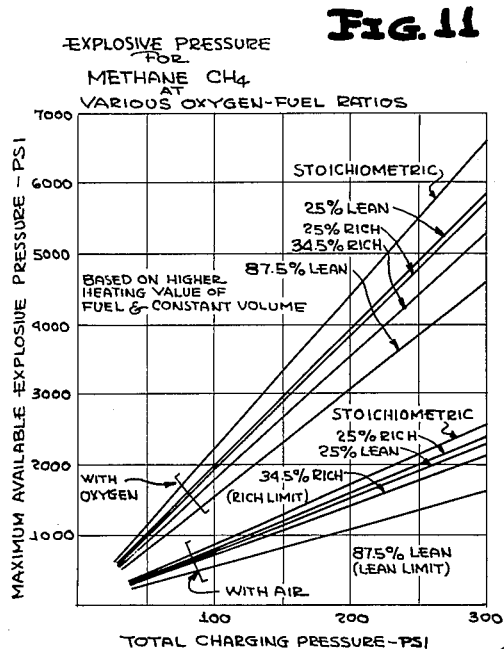
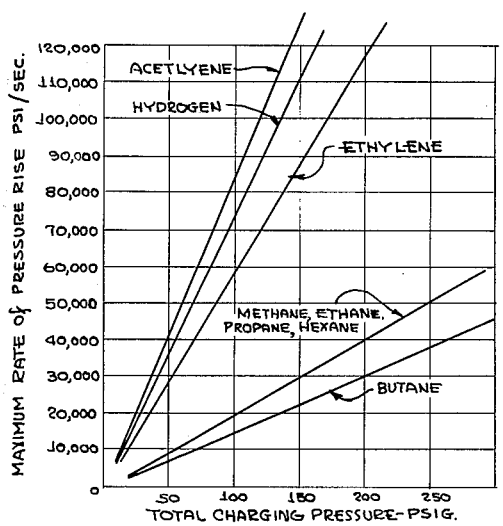
INVENTOR
CURTIS E. MAIER
BY
       Mason, Porter, Diller & Stewart
                               ATTORNEYS United States Patent Office 3,228,222
Patented Jan. 11, 1966

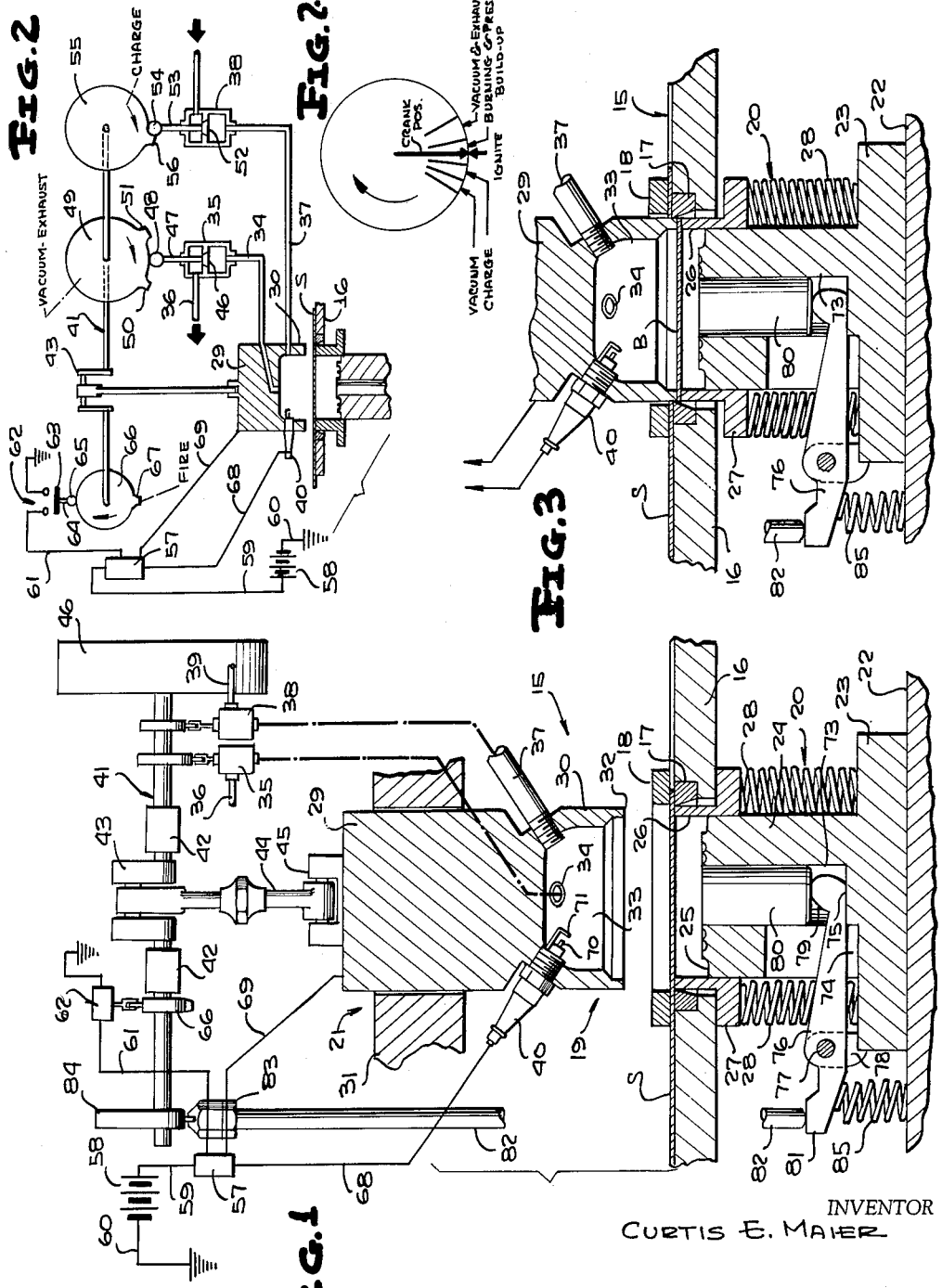

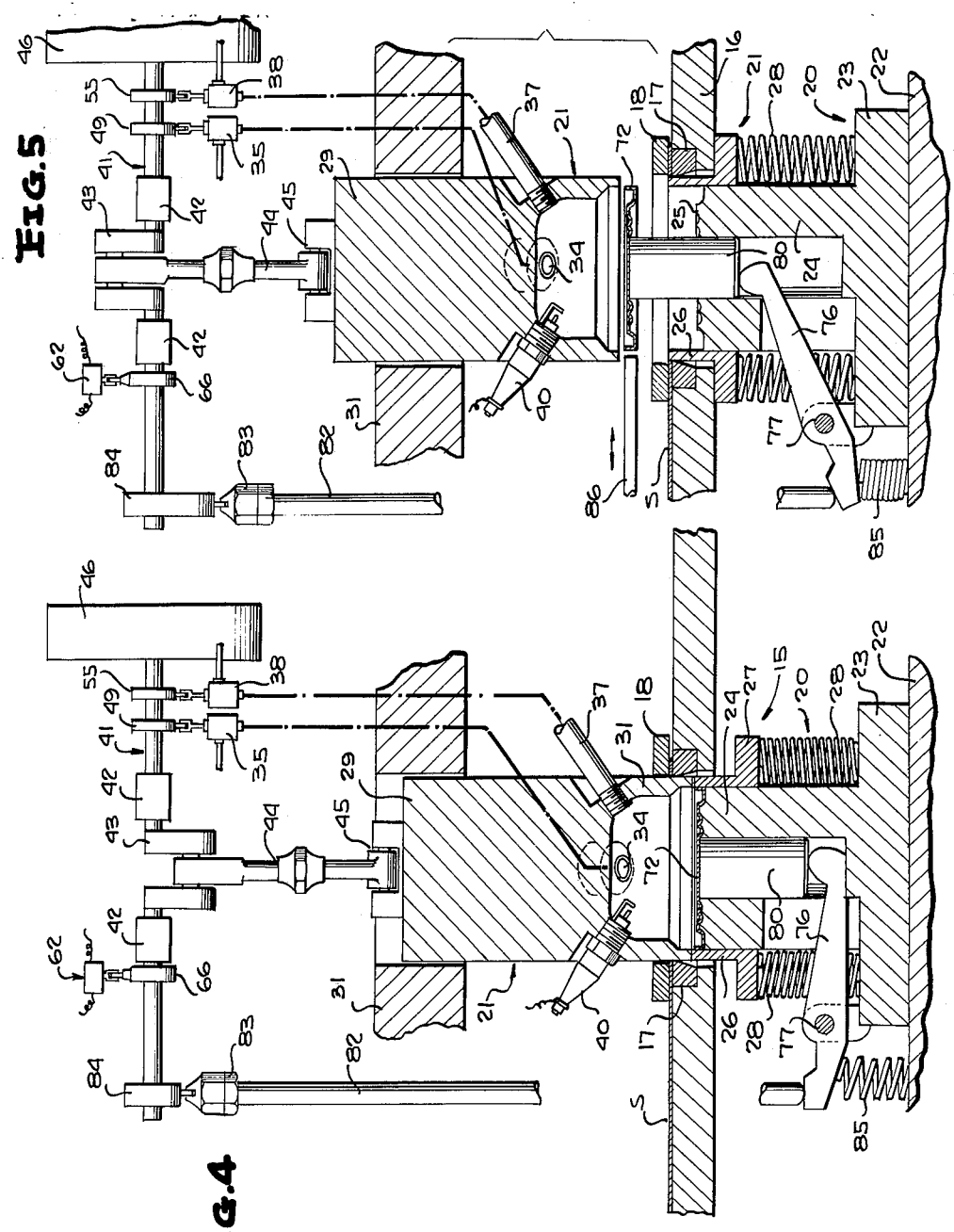

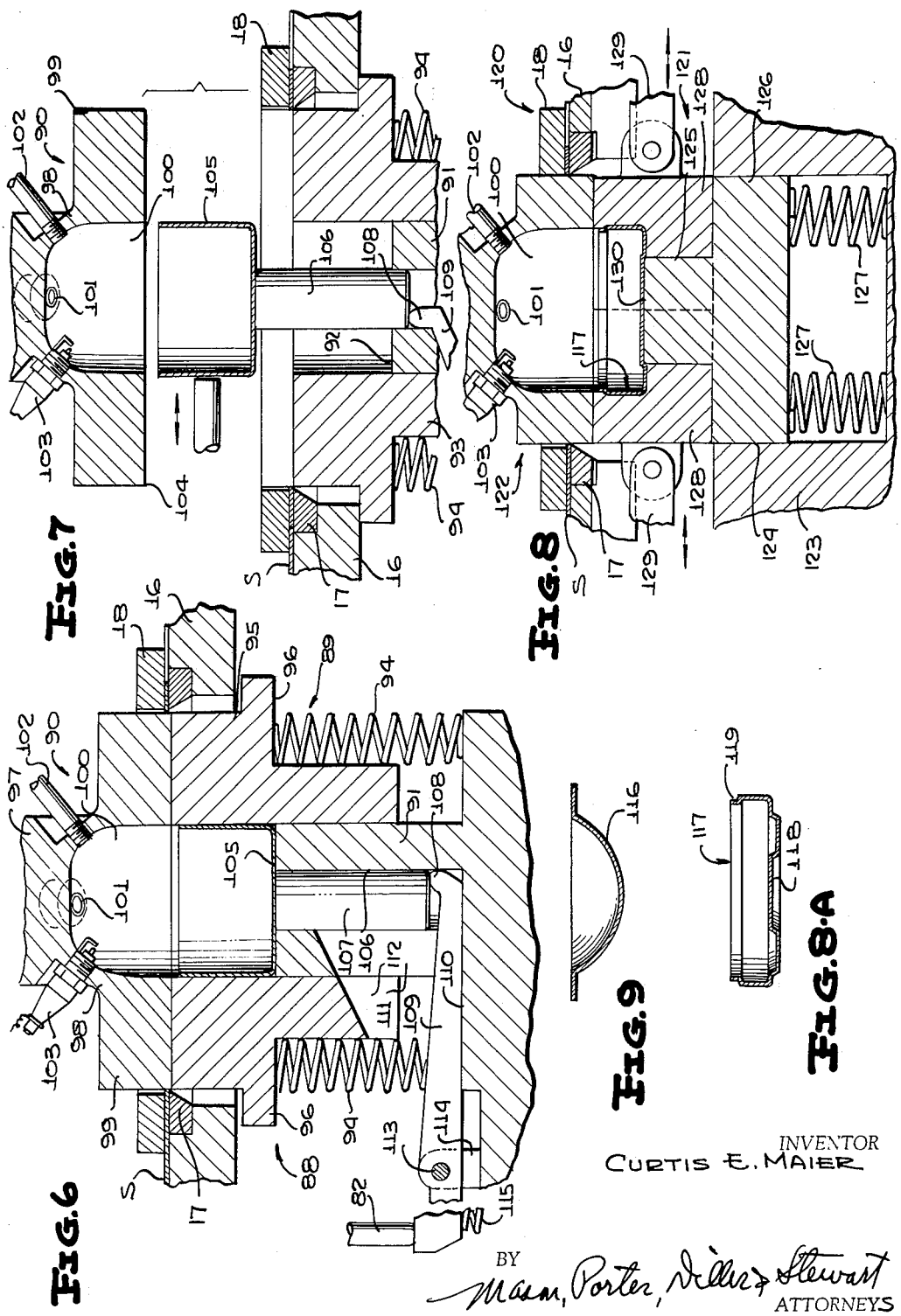

3,228,222
METHOD AND APPARATUS FOR THE EXPLOSION FORMING OF HOLLOW OBJECTS, INCLUDING SUCH CONTAINER ELEMENTS AS CUPS, CANS, CAN ENDS
Curtis E. Maier, Chicago, Ill., assignor to Continental Can Company, Inc., New York, N.Y., a corporation of New York
Filed Apr. 25, 1962, Ser. No. 190,028
23 Claims. (Cl. 72—56)

This invention relates in general to new and useful improvements in the formation of hollow objects including container elements, and more particularly relates to a new and useful method and apparatus for explosion forming of container elements, including cups, cans, can ends, etc.

A primary object of this invention is to provide novel method and apparatus for forming in a single continuous operation a hollow object wherein a sheet of suitable ductile material is passed into the apparatus and during the single continuous operation, a blank is sheared from the sheet and then formed by an explosion forming method. The invention is readily adapted for use in the manufacture of containers, including pails, cups, cans, can ends and similar elements, but is not so limited. The invention may be utilized equally as well in the formation of numerous industrial items including nose cones, automobile hub caps, hollow formed instrument covers, numerous hollow airplane parts, etc. The invention, of course, is particularly well adapted for the forming of hollow articles wherein the hollow articles are to be produced in quantity.

Although it is the primary purpose of the invention to utilize a continuous operation in the forming of a hollow object, it is within the spirit and scope of the invention to separately form blanks from a sheet, and then explosion form the required hollow articles from the blanks in a separate operation in accordance with commercially acceptable practices.

The invention is primarily adapted for use in conjunction with ductile metals, such as steel, tin-coated steel, aluminum and like metals, but is not so restricted. The invention can be practiced with plastic materials, including substantially all of the typical thermoplastic polymeric materials and some of the so-called thermosetting types.

Another object of this invention is to provide a novel method of forming container elements and the like from a generally flat sheet, the method including the continuous steps of shearing a blank from the sheet, and then gripping the blank within a mold, after which the blank is shaped to the shape of the mold by explosion forming.

Another object of this invention is to provide a novel method of forming hollow elements, including containers, wherein a sheet is provided and a combustion chamber defining member is engaged with the sheet to shear from the sheet a blank, which blank is then gripped by the combustion chamber defining member in conjunction with a mold element and in sealed relation with respect to the mold element, after which an explosive gas mixture is exploded with the resultant forces from the explosion acting upon the blank to shape the blank in accordance with the shape of the mold element.

Another object of this invention is to provide a method of forming a hollow article, such as a container, utilizing a two-piece structure which includes a combustion chamber defining member and a cooperating mold, the method including the steps of utilizing a combustion chamber defining member to shear a blank from a sheet and then further utilizing the combustion chamber defining member in cooperation with the mold to clamp and shape the blank within the mold.

A further object of this invention is to provide a novel method of forming a hollow article, such as a container, from a generally flat sheet in a single continuous operation wherein a two-piece forming unit is utilized, the forming unit including a lower mold and an upper combustion chamber defining member, and there being provided a shearing die, the method including the feeding of the flat sheet over the shearing die, the downward movement of the combustion chamber defining member into cooperating relation with the shearing die to shear a blank from the sheet, after which the combustion chamber defining member cooperates with the mold to clamp the newly formed blank and an explosive force is applied to the blank from the combustion chamber to force the blank down into the mold and to effect the shaping of the blank within the mold to the internal configuration of the mold.

Another object of this invention is to provide a novel apparatus for effecting the explosion forming of hollow articles including containers and like articles within a mold wherein a sheet of material is provided, the apparatus including a shearing die, a combustion chamber defining member, and a mold, the combustion chamber defining member cooperating with the shearing die to effect the cutting of a blank from the sheet, and the mold being of a two-piece construction including a resiliently mounted sleeve cooperable with the combustion chamber defining member to effect the clamping of the blank and the sealing of the combustion chamber wherein the blank may be readily held, and there further being provided means connected to the combustion chamber defining member for supplying an explosive gas mixture to the combustion chamber thereof and then igniting this explosive gas mixture so as to exert a downward pressure on the blank to effect the shaping of the blank to correspond to the internal configuration of the mold.

A still further object of this invention is to provide a novel apparatus for the explosion forming of hollow articles, including containers and like articles, from a flat sheet, and which apparatus may be repeatedly used on the same sheet to effect the formation of a plurality of articles from a single sheet, the apparatus including a suitable sheet support which has a shearing die incorporated therein, and a forming unit including an upper combustion chamber defining member which is mounted for vertical reciprocation and which cooperates with the shearing die to shear blanks from the sheet, the forming unit further including a lower half in the form of a mold which is cooperable with the upper combustion chamber defining member to effect the clamping of a blank therebetween and forming a sealed combustion chamber in which an explosion may take place to effect the shaping of the blank within the mold.

Yet another object of this invention is to provide a novel apparatus for the explosion forming of hollow articles including containers and like articles from sheets, the apparatus being driven from a single crankshaft to which there is connected an upper combustion chamber defining member mounted for reciprocatory movement and suitable means for effecting in timed relation the exhausting of gases from the combustion chamber thereof, the supplying of an explosive gas mixture to the combustion chamber, and the igniting of the explosive gas mixture, the apparatus further including a fixed shearing die ring over which the sheet from which an article is to be formed is positioned wherein when the upper combustion chamber defining member is moved downwardly through the shearing die ring, a blank is sheared from the sheet, and the apparatus further including a lower mold which includes a resiliently mounted sleeve for initial cooperation with the combustion chamber defining member to effect the clamping of a blank sheared from the combustion chamber defining member, and then effecting the shaping of the blank when the explosive gas mixture within the combustion chamber is exploded.

Another object of this invention is to provide a novel method of forming hollow articles, including containers and container elements, the method including the steps of forming a blank from a sheet, heating the blank to temporarily increase the ductility of the metal thereof, and then explosion forming the blank within a mold through the igniting of an explosive gas mixture within a combustion chamber which cooperates with the mold to clamp the blank and with the blank temporarily sealing the combustion chamber. In conjunction with this object, it is pointed out that it has been found that certain polymeric materials are more readily shaped when slightly heated at normal room temperatures and the heating of the blank more particularly applies to the polymeric materials although the heating of metal blanks will also facilitate the forming thereof.

Another object of this invention is to provide a novel method of explosion forming hollow articles wherein the method may readily apply to the first forming of blanks from sheet material, and then the shaping of the blanks by clamping the blanks between a combustion chamber defining member and a mold with each blank, in turn, sealing the combustion chamber to restrict the escape of gases therefrom, and in the practicing of the method, the combustion chamber is filled with a combustible gas mixture, which, when ignited, produces an explosive shock wave having a very high energy instantaneous wave front which acts upon the blank and instantaneously forces the blank into the mold and shapes the blank in accordance with the internal configuration of the mold.

A still further object of this invention is to provide a method of explosion forming hollow articles wherein the method may be utilized on a production line basis whereby the utilization of explosion forming in the formation of numerous hollow objects, such as normally relatively inexpensive mass produced container elements, is economically feasible.

With the above and other objects in view that will hereinafter appear, the nature of the invention will be more clearly understood by reference to the following detailed description, the appended claims and the several views illustrated in the accompanying drawings:

In the drawings:

FIGURE 1 is a schematic vertical sectional view showing the apparatus in accordance with this invention with a sheet in position to be worked upon in the formation of a can end.

FIGURE 2 is a schematic view showing the various controls of the apparatus and the arrangement of the cams for operating the controls.

FIGURE 2A is a timing diagram showing the various operating portions of the cycle of operation of the apparatus.

FIGURE 3 is a fragmentary schematic vertical sectional view along the general lines of FIGURE 1 and shows the apparatus immediately after a blank has been sheared from the sheet and has been gripped between the combustion chamber defining member and the mold.

FIGURE 4 is a schematic vertical sectional view similar to FIGURE 1 and shows the apparatus immediately subsequent to the explosion of the explosive gas mixture within the combustion chamber and the forming of the blank within the mold.

FIGURE 5 is a vertical sectional view similar to FIGURE 4 and shows the manner in which a formed article is ejected from the apparatus.

FIGURE 6 is a fragmentary vertical sectional view similar to FIGURE 4, but showing only the lower portion of the apparatus of FIGURE 4, with the apparatus being of a modified form of the shaping of relatively deep articles, such as cans.

FIGURE 7 is a vertical sectional view similar to FIGURE 6 and shows the can in the process of being ejected from the apparatus.

FIGURE 8 is a vertical sectional view through another form of mold construction wherein the mold is of the split mold type so that the upstanding wall of the article being formed need not be straight, but may be configurated.

FIGURE 8A is a vertical sectional view of a shallow can which may be formed in accordance with this invention in the manner shown in FIGURE 8.

FIGURE 9 is a vertical sectional view taken through a domed container element which may be formed in accordance with this invention.

FIGURE 10 is a chart showing the maximum theoretical explosive pressure of various fuels with oxygen and air at different charging pressures.

FIGURE 11 is a chart showing the theoretical maximum explosive pressure for methane and various oxygen and air to fuel ratios.

FIGURE 12 is a chart showing the maximum rate of pressure rise of different fuels combined with oxygen for different pressure charging.

FIGURE 13 is a chart showing the maximum rate of pressure rise of different fuels mixed with air for different charging pressures.

Reference is now made to the drawings in detail, wherein there is illustrated schematically an apparatus which is suitable for the purpose of carrying out the invention. The apparatus of FIGURES 1 through 5 is generally referred to by the numeral 15, and includes a sheet support 16. While the term "sheet" will be used herein to describe the material from which the articles are to be formed, it is to be understood that the invention is not intended to be limited specifically to a sheet, but may be utilized in conjunction with a continuous strip or, if desired, from smaller blank-like elements.

In accordance with the invention, a sheet S will be fed along the sheet support 16 in any desired manner. The sheet support 16 carries a shearing die 17 which is of the ring type. A stripper 18 is disposed in overlying relation with respect to the die 17 and is spaced thereabove a sufficient distance for the passage of the sheet S between the die 17 and the stripper 18.

The apparatus 15 also includes a forming unit, which is generally referred to by the numeral 19. The forming unit includes a lower mold, generally referred to by the numeral 20, and an upper combustion chamber defining member, generally referred to by the numeral 21.

The mold 20 is mounted on a suitable base 22, such as an adjustable press platen, beneath the sheet support 16. The mold 20 includes a base element 23 which is seated on the base 22 and which supports an upstanding portion 24 of a constant cross-section. The upstanding portion 24 terminates in an upper end 25 which forms the bottom of the mold 20, and, when desired, may be suitably shaped or embossed.

The mold 20 also includes a sleeve 26 which is telescoped around the upstanding portion 24 and which is guided thereby for vertical movement. The sleeve 26 includes an enlarged base 27 against which suitable spring means 28 resting upon the base element 23 bear. The spring means 28 may be of any type, although in the drawings, the spring means have been illustrated as being in the form of a plurality of coil springs. It is necessary, however, in accordance with the invention, that the sleeve 26 be resiliently urged upwardly at all times with the sleeve 26 being movable downwardly and resiliently supported. It is also necessary that the spring means 28 does not project the sleeve 26 up into the path of the sheet S. To this end, in the uppermost position of the sleeve 26, the base 27 of the sleeve 26 may engage the support 16, as is generally shown in FIGURE 1.

The combustion chamber defining member 21 includes an upper piston-like portion 29 and a lower chamber forming portion 30. The piston-like portion 29 is guided in a suitable guide plate 31 for vertical movement only. The chamber-like portion 30 has a hardened outer corner portion 32 which cooperates with the shearing die 17 to shear a blank B from the sheet S, as is shown in FIGURE 3. It is to be noted that the lower end of the chamber forming portion 30 corresponds to the upper end of the sleeve 26 so that the two may cooperate to effectively grip the blank B after it has been sheared from the sheet S.

The chamber forming portion 30 defines a combustion chamber 33 and is provided with a first conduit 34 for the purpose of exhausting the interior of the combustion chamber 33. The conduit 34 is connected in any suitable manner to an exhaust valve 35 which controls the communication of the chamber 33 with a vacuum source through an exhaust pipe 36 carried by the exhaust valve 35.

Another conduit 37 opens into the chamber 33 and has the opposite end thereof connected to a gas control valve 38. The gas control valve 38 has a gas-air supply line 39 connected thereto and serves to control the flow of a gas-air charge into the chamber 33. At this time, it is pointed out that the conduits 34 and 37 must either be flexible or have flexible connections to compensate for the vertical reciprocation of the combustion chamber defining member 21 to which they are connected, the valves 35 and 38 remaining stationary.

The chamber defining portion 30 also is provided with an electrical igniter 40 for igniting the gas-air charge within the chamber 33. The igniter 40 is connected to a suitable electrical circuit in a manner to be described in detail hereinafter.

A crankshaft 41 is disposed above the remainder of the apparatus 15 and is mounted for rotation within suitable bearings schematically illustrated, as at 42. The crankshaft 41 includes a crank portion 43 to which there is connected a connecting rod 44. The connecting rod 44 is adjustable in length to properly position the combustion chamber defining member 21 relative to the mold 20. The lower end of the connecting rod 44 is connected to the upper piston-like portion 29 of the combustion chamber defining member 21, as at 45. Suitable drive means 46 are connected to one end of the crankshaft 41 for effecting the rotation thereof. It is to be understood that depending upon how the sheet S is fed and the formed article is removed from the forming unit 19, the crankshaft 41 will either be driven continuously or will be provided with an interrupted drive. It will be understood that when an interrupted drive is utilized, the interrupted drive will be of a conventional type, and accordingly, no attempt is made here to illustrate or describe such a drive.

Considering first the valve 35, this valve is illustrated in FIGURE 2 as including a valve member 46 which is carried by a valve stem 47 having a cam follower 48 on the upper end thereof. The cam follower 48 is engaged with a cam 49 carried by the crankshaft 41. The cam 49 has a pair of cam lobes 50 and 51 each of a relatively short circumferential extent to provide for two short periods of exhaust for the chamber 33. It is to be understood that the valve 35 is only schematically illustrated and the internal construction thereof may vary as desired.

The valve 38, like the valve 35, is schematically illustrated to include a valve member 52 which is carried by a valve stem 53 and the valve stem 53 is provided with a follower 54 which engages a cam 55. The cam 55 has a cam lobe 56 which is also of a relatively short circumferential extent.

The electrical circuit for the electrical igniter 40 includes a spark coil 57 which has the primary winding thereof connected to a battery 58 by means of a wire 59. The other end of the battery 58 is grounded by means of a wire 60. Also, the opposite end of the primary winding of the spark coil 57 is grounded through a wire 61 in which there is incorporated a normally open switch 62. The switch 62, as is illustrated in FIGURE 2, includes a circuit maker 63 carried by an actuator 64 which, in turn, carries a cam follower 65. A cam 66 carried by the crankshaft 41 is associated with the switch 62 and includes a small cam lobe 67 for engaging the follower 65 to momentarily close the switch 62 and complete the circuit through the wire 61 to the ground. When this momentarily occurs, there is a flow of current through the primary winding of the spark coil 57 with a resultant flow of current through a secondary winding of the spark coil 57. The opposite ends of the secondary winding of the spark coil 57 have wires 68 and 69 connected thereto. The wire 68 is connected to the igniter 40 and the wire 69 is connected to the combustion chamber defining member 21 to which the igniter 40 is grounded. As a result, when the switch 62 is momentarily closed, high voltage current will be supplied to the igniter 40 to effect the forming of a spark between electrodes 70 and 71 of the igniter 40 within the chamber 33, and the resultant exposion of the explosive gas-air charge disposed within the chamber 33.

Reference is now made to FIGURE 3 in particular, wherein it is seen that after the blank B has been sheared from the sheet S by the cooperative movement of the combustion chamber defining member 21 with respect to the shearing die 17, the blank B is moved down through the shearing die 17 together with the combustion chamber defining member 21 which also moves through the shearing die 17. Since the upper end of the sleeve 26 immediately underlies the sheet S, immediately after the blank B is formed, the blank engages the upper end of the sleeve 26 and is clamped thereagainst by the downwardly moving combustion chamber defining member 21. Due to the resilient mounting of the sleeve 26, the peripheral portion of the blank B is clamped between the sleeve 26 and the lower end of the combustion chamber defining member 21.

In accordance with the general intent of the invention, all during the blank shearing operation, the chamber 33 will be exhausting through the conduit 34 due to the operation of the cam lobe 56 so that when the blank B is gripped between the combustion chamber defining member 21 and the sleeve 26, the chamber 33 may be rapidly evacuated. Shortly after the blank B has been gripped beween the combustion chamber defining member 21 and the sleeve 26, the exhaust cycle stops and the cam 55 acts to open the valve 38 so that the desired gas-air charge is supplied to the interior of the chamber 33. At this time, it is pointed out that while the drawings show that a gas-air charge is delivered, if desired, the gas charge may be first delivered to the chamber 33, after which a suitable oxidizing agent, preferably air, but possibly oxygen, is delivered into the chamber 33.

During the time the gas-air charge is being delivered to the chamber 33, the combustion chamber defining member 21 is being continued to be moved downwardly, with the resultant downward movement of the sleeve 26 and the compressing of the spring means 28 to more firmly grip the blank B between the sleeve 26 and the combustion chamber defining member 21. Shortly before the combustion chamber defining member 21 reaches the lower end of its stroke, the delivering of the gas-air charge to the chamber 33 is discontinued. When the combustion chamber defining member 21 approaches the lower end of its travel, the igniter 40 is energized to ignite the explosive gas-air charge within the chamber 33. As a result of the igniting of the explosive gas-air charge in the chamber 33, a shock wave of exploded gases of combustion is directed against the blank B in a downward direction, with the result that the blank B is simultaneously drawn inwardly from between the sleeve 26 and the combustion chamber defining member 21 and forced downwardly in the sleeve 26 against the upper end 25 of the upstanding portion 24. The flat blank B is then changed from its flat state to a generally cup-shape, with the lower end thereof assuming a configuration in accordance with the configuration of the upper end 25 of the upstanding portion 24. This is best shown in FIGURE 4. As the explosion occurs in the chamber 33, the air beneath the blank B may be forced through the clearance between the upstanding portion 24 and the sleeve 26, and through the clearance between the bore 73 and ejector pin 80, or a conventional vent (not shown) may be provided in the mold 20.

In FIGURE 4, a can end 72 has been formed from the blank B. However, in accordance with the construction of the mold 20, numerous other articles may be so formed.

After the blank B has been shaped within the mold 20 by the explosive force resulting from the igniting of the explosive gas-air charge, the crankshaft 41 continues to rotate to effect the upward movement of the combustion chamber defining member 21. The sleeve 26 moves upwardly with the combustion chamber defining member 21 until it reaches its uppermost position, after which the combustion chamber defining member 21 moves alone to its initial starting position of FIGURE 1, as is best shown in FIGURE 5. It is to be understood that shortly after the explosion within the chamber 33 has taken place and subsequent to the completion of the forming of the blank B, the cam 49, through the lobe 51, acts to open the exhaust valve 35 so that the gases of combustion are removed from the chamber 33 and the pressure within the chamber 33 is relieved. This is best seen by reference to the diagram of the cycle of operation shown in FIGURE 2A.

It is to be noted that when the combustion chamber defining member 21 moves upwardly, it will drag against the sheet S due to its initial passage therethrough. The stripper 18 serves to hold the sheet S down during the upward movement of the combustion chamber defining member 21.

The apparatus 15 is provided with means for ejecting the article formed within the mold 20. As is clearly shown in FIGURE 1, the upstanding portion 24 of the mold 20 is provided with a central bore 73 which opens through the upper end 25 thereof. A slot 74 opens from the bore 73 out through the side wall of the upstanding portion 24. The bore 73 has a bottom wall 75. A lever 76 is mounted on a horizontal pivot pin 77 carried by ears 78 which are suitably secured to the base 23. The lever 76 projects into the bore 73 through the slot 74 and is provided at the end thereof disposed within the bore 73 with an upstanding rounded portion 79. An ejector pin 80 is mounted in the bore 73 for vertical movement and rests upon the upstanding portion 79. At the same time, the lever 76 has the right end thereof, as viewed in FIGURE 1, resting upon the bottom wall 75. The upper end of the ejector pin 80 is disposed flush with the upper end 25 of the upstanding portion 24.

In order that the ejector pin 80 may be actuated to effect the ejection of an article, such as the can end 72, from within the mold 20, the lever 76 projects outwardly from the mold 20 from the pivot pin 77 and includes an extension 81. The extension 81 is engaged by an operating rod 82 which is suitably guided in a manner not shown for vertical movement and has an adjustable upper end 83 which rides against a cam 84 carried by the crankshaft 41. The cam 84 serves to move the left-hand end of the lever 76 downwardly in timed relation to the operation of the apparatus 15 so that when the combustion chamber defining member 21 moves upwardly at the end of an article forming operation, the ejector pin 80 is moved upwardly to eject the newly formed article from within the mold 20. A return spring 85 is associated with the article ejecting mechanism to automatically return the components thereof to the retracted position of FIGURE 1 at the end of each article ejecting cycle.

Reference is made to FIGURE 5 wherein it is shown that after the article, such as the can end 72, has been ejected from the mold 20 by the ejector pin 80, a reciprocating push rod 86, which operates in any known, but undisclosed, manner, engages the can end or other ejected article and moves the same laterally off of the ejector pin 80. If desired, the push rod 86 may be disposed at right angles to the position shown in FIGURE 5.

After the completion of the article forming operation, the sheet S is advanced from left to right, as viewed in FIGURES 1 and 4, and the operation may be repeated.

At this time, it is pointed out that the thickness of the wall of the chamber defining portion 30 is in accordance with the amount of metal required in the drawing or forming of the article. If the article is to have very small upstanding walls, then the thickness of the chamber defining portion 30, as well as the thickness of the sleeve 26, will be restricted. On the other hand, if the article is to have relatively high upstanding walls, such as in the case of a cup or a can, then the chamber defining portion 30 would have to have much thicker walls. With respect to this, reference is made to FIGURES 6 and 7.

In FIGURES 6 and 7, there is illustrated a modified form of forming unit construction which is generally referred to by the numeral 88. The forming unit 88 includes a lower mold 89 and an upper combustion chamber defining member 90. The mold 89 includes an upstanding portion 91 which is suitably supported and is fixed against vertical movement. The upstanding portion 91 has an upper end 92 which forms the bottom of the mold 89. A sleeve 93 is disposed about the upstanding portion 91 for vertical movement. This vertical movement is resisted by spring means 94 which bear against the underside of an upper outstanding flange 95 of the sleeve 93. The flange 95 is provided with suitable lower projections 96 for engagement with the underside of the sheet support 16 to limit the upward movement of the sleeve 93 by the spring means 94 to a position immediately under the path of travel of the sheet S.

The combustion chamber defining member 90 includes an upper piston-like portion 97 and a lower chamber defining portion 98 which includes a very wide base portion 99. The base portion 99 of the chamber defining portion 98 corresponds to the flange 95 of the sleeve 93.

It is to be understood that the combustion chamber defining member 90 will be mounted in the same manner as described with respect to the combustion chamber defining member 21 and will be driven by a crankshaft, such as the crankshaft 41. The chamber defining portion 98 defines a combustion chamber 100 into which there opens an exhaust conduit 101 and a conduit 102 for supplying a gas-air charge to the chamber 100. The chamber defining portion 98 is also provided with an igniter 103 which corresponds to the igniter 40.

The base 99 of the chamber defining portion 98 has a hardened lower edge 104 which cooperates with the shearing die 17 to effect the shearing of a blank B from the sheet S. The stripper 18 cooperates with the base 99 to strip the sheet S therefrom.

The forming unit 88 also provides means for ejecting a formed article, such as the can 105, from the mold 89. The mold 89 is adapted to receive the ejecting means by the provision of a centrally located bore 106 in the upstanding portion 91 in which there is positioned an ejector pin 107. The ejector pin 107, when fully retracted, has the upper end thereof flush with the upper end 92 of the upstanding portion 91 and thus forms a part of the bottom of the mold 89.

The ejector pin 107 rests upon a rounded upstanding end portion 108 of a lever 109, which, in its normal position, rests upon a wall surface 110 of the base portion of the mold 89. In this manner, the downward movement of the ejector pin 107 is limited. The upstanding portion 91 is provided with a recess 111 through which the lever 109 passes. Also, the lower part of the sleeve 93 is provided with a recess 112 through which the lever 109 passes.

The lever 109 is carried by a pivot pin 113 which, in turn, is supported by a pair of upstanding ears 114 carried by the base of the mold 89. The lever 109 is actuated by means of the rod 82 in the same manner as is the lever 76. A return spring 115 is provided and engages the lever 109. The usual push rod 86 is provided for removing the can 105 from the ejector pin 106.

It will be understood that the use of the apparatus incorporating the forming unit 88 will be the same as that described with respect to the aparatus 15. The only difference between the forming units 19 and 88 is that the forming unit 88 is intended for the forming of a one-piece can 105 which has high side walls or body portion, with the result that the blank B must have a much greater cross-sectional area than the cross-section of the base of the article being formed. It is to be understood that all of the blank B clamped between the base 99 and the flange 95 will be forced down into the sleeve 93 to form the wall of the can 105. As the explosion occurs in the chamber 100, the air beneath the can 105 may be forced through the clearance between the upstanding portion 91 and the sleeve 93, and through the clearance between the bore 106 and ejector pin 107, or a conventional vent (not shown) may be provided in the mold 89.

Reference is made to FIGURE 9 wherein there is illustrated a dome-shaped container element 116. This container element 116 could be used, for example, as a top portion of a pressure container.

In FIGURE 8A, there is illustrated a shallow can 117, which may be used, for example, as a shoe polish can. It is to be noted that the can 117 has a configurated bottom 118 and a recessed upper wall portion 119. It is obvious that the can 117, if formed in a mold of the type shown in FIGURES 1 and 6, could not be removed from the mold. Accordingly, reference is made to FIGURE 8 wherein a forming unit, generally referred to the numeral 120, is illustrated.

The forming unit 120 includes a lower mold, generally referred to by the numeral 121, and an upper combustion chamber defining member, generally referred to by the numeral 122, which upper combustion chamber defining member will be identical with the combustion chamber defining member 90 except for proportions and will not be otherwise described in detail and like numerals will be applied to like specific components thereof.

The mold 121 includes a base 123 having a recess 124 formed therein. An upstanding member 125 is provided with a base 126 which is seated in and guided within the recess 124 for vertical movement. Vertical movement of the upstanding member 125 is resisted by springs 127 engaged with the base 123 and disposed within the recess 124 beneath the base 126.

The mold 121 also includes a pair of cooperating mold halves 128 which have connected thereto linkage 129 for effecting the opening and closing thereof. It is to be noted that the upstanding member 125 extends up through the bottom portions of the mold halves 128 with the upper end 130 of the upstanding member 125 serving to form the desired configuration in the bottom 118 of the can 117 being formed.

The sheet S is fed across the suport 16 in the normal manner and the combustion chamber defining member 122 cooperates with the shearing die 17 to shear a blank from the sheet S. Further downward movement of the combustion chamber defining member 122 results in the clamping of the blank between the lower end of the combustion chamber defining member 122 in the upper surfaces of the mold halves 128. It is to be understood that the mold halves 128 are vertically movable with the upstanding member 125 and its associated base 126 so that the mold halves 128 may move downwardly with the combustion chamber defining member 122 with this downward movement being opposed by the springs 127. After the blank has been firmly clamped, an explosive gas mixture is introduced into the combustion chamber defining member 122 and ignited in the manner previously described so that the results of the combustion of the gases will provide an explosive shock wave having a very high energy, instaneous wave front, which will force the blank down into the cavity of the mold 121 and shape the blank to conform to the mold cavity.

After the can 117 has been formed within the mold 121, and the combustion chamber defining member 122 has moved out of engagement with the mold halves 128, the mold halves 128 may be separated by the linkage 129 to facilitate the removal of the can 117 in any desired manner.

The illustrated apparatus and methods have been restricted to container elements as the objects being formed in accordance with the invention. However, the invention is not so limited nor is it the intention of applicant to so restrict the invention. The invention has a wide application in all phases of the container field, and while the invention may be of great use in the container field where objects are made by the millions, the invention could be utilized in forming other hollow objects, such as toy components, nose cones, automobile hub caps, hollow formed instrument covers, numerous hollow aircraft parts, etc.

It is also to be appreciated that the particular material that may be formed in accordance with this invention is not restricted to metal sheets in that certain plastic sheets may be formed utilizing the concept of this invention. The invention will function with all of the typical thermoplastic polymeric materials and with a number of the so-called thermosetting types. It is desirable, but not necessary, to heat the plastic sheet material just prior to the explosive forming thereof.

It is also within the concept of the invention to preheat metal sheets as well as plastic sheets. The preheating of metal sheets permits the explosive forming of metals having less ductility than steel, for example, or the forming of heavy gauges of metal, or more extensive forming of the metal, or a lesser force required for the same degree of forming, or the forming of more complex shapes, or better and sharper detail in the formed shape, or in the surface embossing or debossing of designs on the surfaces of explosively formed objects.

Although the invention has been specifically disclosed and illustrated as relating to a continuous operation wherein a sheet or strip is fed and in a continuous movement of the apparatus a blank is sheared from the sheet and then formed, in accordance with the accepted commercial practice, the blanks could very well be formed from the sheet or strip in one machine and then the blanks transferred to another machine wherein the blanks are explosively formed in accordance with this invention utilizing any one of the disclosed apparatus without utilizing the benefit of the shearing of the blank during the operation of the apparatus. For example, the die 17 and the stripper 18 could be eliminated from the apparatus disclosed and the preformed blanks fed to the apparatus.

It is also proposed to apply a decorative coating to the sheet or blanks prior to the forming of hollow objects therefrom. It is possible to apply, for example, by lithographing, an enamel coating to the sheet material and the enamel coating being applied in a design which, upon stretching of the material, would produce on the finished hollow object the desired surface decoration.

Numerous experiments have been carried out in this field and while it is well known that gas pressure can be effective in the shaping of articles within a mold, the use of gas pressure alone is not sufficient for high speed accurate shaping of articles. This invention relies principally on the explosion shock wave resulting from the explosion of the explosive gases with this shock wave having a very high energy, instantaneous wave front. It is for this reason that certain explosive gas mixtures are better than others, as is clearly shown in the graphs of FIGURES 10 through 13.

The primary test conducted with respect to this matter has utilized a mixture of city gas and air. The city gas utilized was of approximately 1,000 B.t.u. per cubic foot heat content, and from an economical standpoint, in many instances, this particular gas mixture may prove the most economically feasible. On the other hand, as is clearly indicated by the graphs, a much greater effect may be obtained utilizing a mixture of acetylene and oxygen. The graphs show the results obtainable with the various hydro-carbons mixed with either oxygen or air, as well as a combustible mixture of hydrogen and either oxygen or air. A hydrogen oxygen or air mixture provides a very cleanly burning fuel and may be a desirable mixture, although the maximum available explosive pressure utilizing hydrogen is not as great as that obtainable with the hydro-carbons tested. On the other hand, as is clearly indicated in the graphs of FIGURES 12 and 13, hydrogen produces a very high maximum rate of pressure rise and is second as compared to acetylene of the gases tested. It was found during testing that the deformation of the can body was not dependent primarily on the maximum available pressure as a result of the explosion, but upon the pressure shock wave, and this is borne out by a comparison of the graphs of FIGURES 10 and 12, for example. The results obtainable with hydrogen were very good, although the maximum available explosive pressure utilizing hydrogen was much lower than that available with the tested hydrocarbons.

Although some gas mixtures may produce much better results than others for complicated reshaping of can bodies, where the reshaping is relatively mild, it will, of course, be economically feasible to utilize gas mixtures which produce much less pressures and have lower rates of pressure rise in that these will not be necessary and will not require the more expensive gases.

Although preferred embodiments of the invention have been illustrated and described herein, it is to be understood that the invention is not limited to the specific structures disclosed or to the exact method steps set forth with respect to the disclosed structures, and minor modifications may be made in the invention without departing from the invention within the scope and spirit of the appended claims.

I claim:

1. A method of forming containers and like shaped articles from a sheet in a single continuous operation utilizing a forming unit including a combustion chamber defining member and a mold comprising the steps of shearing a blank from the sheet within the combustion chamber defining member, clamping the blank against the mold, and explosive forming the blank within the mold.

2. A method of forming containers and like shaped articles from a sheet in a single continuous operation comprising the steps of shearing a blank from the sheet, clamping the blank against a mold, and explosive forming the blank within the mold through the explosion of an explosive gas mixture above the blank outside of the mold.

3. A method of forming containers and like shaped articles from a sheet in a single continuous operation comprising the steps of shearing a blank from the sheet, clamping the blank against a mold, explosive forming the blank within the mold through the explosion of an explosive gas mixture above the blank outside of the mold, removing the article from the mold, shifting the sheet relative to the mold, and repeating the steps.

4. A method of forming containers and like shaped articles from a sheet in a single continuous operation utilizing a forming unit having an upper combustion chamber defining member and a lower mold comprising the steps of shearing a blank from the sheet, clamping the blank between the combustion chamber defining member and the mold, and exploding an explosive gas mixture within the combustion chamber defining member to form the blank within the mold.

5. A method of forming containers and like shaped articles from a sheet in a single continuous operation utilizing a forming unit having an upper combustion chamber defining member and a lower mold comprising the steps of shearing a blank from the sheet utilizing the combustion chamber defining members, clamping the blank between the combustion chamber defining member and the mold, and exploding and explosive gas mixture within the combustion chamber defining member to form the blank within the mold.

6. A method of forming containers and like shaped articles from a sheet in a single continuous operation utilizing a forming unit having a movable combustion chamber defining member and a lower mold including a resiliently mounted sleeve comprising the steps of shearing a blank from the sheet, releasably clamping the blank between the combustion chamber defining member and the sleeve, and exploding an explosive gas mixture within the combustion chamber defining member to form the blank within the mold.

7. A method of forming containers and like shaped articles from a sheet in a single continuous operation utilizing a forming unit having a movable upper combustion chamber defining member and a lower mold including a resiliently mounted sleeve comprising the steps of shearing a blank from the sheet utilizing the combustion chamber defining member, releasably clamping the blank between the combustion chamber defining member and the sleeve, and exploding an explosive gas mixture within the combustion chamber defining member to form the blank within the mold.

8. A method of forming containers and like shaped articles from a sheet in a single continuous operation utilizing a forming device having an upper combustion chamber defining member and a lower mold comprising the steps of shearing a blank from the sheet, clamping the blank between the combustion chamber defining member and the mold, and exploding an explosive gas mixture within the combustion chamber defining member to form the blank within the mold while simultaneously drawing the blank from between the combustion chamber defining member and the mold.

9. A method of forming containers and like shaped articles from a sheet in a single continuous operation utilizing a shearing die ring and a forming unit having an upper combustion chamber defining member and a lower mold comprising the steps of positioning the sheet in overlying relation to the shearing die and beneath the combustion chamber defining member, moving the combustion chamber defining member downwardly through the shearing die and shearing a blank from the sheet, clamping the blank between the combustion chamber defining member and the mold, and exploding an explosive gas mixture within the combustion chamber defining member to form the blank within the mold.

10. The method of claim 9 together with the steps of elevating the combustion chamber defining member, removing the formed article, advancing the sheet, and repeating the steps to form a second article from the sheet.

11. A method of forming containers and like shaped articles from a sheet in a single continuous operation utilizing a shearing die ring and a forming unit having an upper combustion chamber defining member and a lower mold comprising the steps of positioning the sheet in overlying relation to the shearing die and beneath the combustion chamber defining member, moving the combustion chamber defining member downwardly through the shearing die and shearing a blank from the sheet, clamping the blank between the combustion chamber defining member and the mold, and exploding an explosive gas mixture within the combustion chamber defining member to form the blank within the mold while simultaneously drawing the blank from between the combustion chamber defining member and the mold.

12. A method of forming containers and like shaped articles from a sheet in a single continuous operation utilizing a shearing die ring and a forming unit having an upper combustion chamber defining member and a lower mold including a resiliently mounted sleeve comprising the steps of positioning the sheet in overlying relation to the shearing die and beneath the combustion chamber defining member, moving the combustion chamber defining member downwardly through the shearing die and shearing a blank from the sheet, releasably clamping the blank between the combustion chamber defining member and the sleeve, and exploding an explosive gas mixture within the combustion chamber defining member to form the blank within the mold.

13. A method of forming containers and like shaped articles from a sheet in a single continuous operation utilizing a shearing die ring and a forming unit having an upper combustion chamber defining member and a lower mold including a resiliently mounted sleeve comprising the steps of positioning the sheet in overlying relation to the shearing die and beneath the combustion chamber defining member, moving the combustion chamber defining member downwardly through the shearing die and shearing a blank from the sheet, releasably clamping the blank between the combustion chamber defining member and the sleeve, and exploding an explosive gas mixture within the combustion chamber defining member to form the blank within the mold, while simultaneously drawing the blank from between the combustion chamber defining member and the mold.

14. A method of forming containers and like shaped articles from a sheet in a single continuous operation utilizing a forming unit having a movable upper combustion chamber defining member and a lower mold including a resiliently mounted sleeve comprising the steps of shearing a blank from the sheet, releasably clamping the blank between the combustion chamber defining member and the sleeve, supplying an explosive gas mixture to the combustion chamber defining member above the blank, igniting the explosive gas mixture to form the blank within the mold, exhausting the gases of combustion from within the combustion chamber defining member, and then separating the combustion chamber defining member and the mold for the removal of the formed article from the mold.

15. An apparatus for forming one-piece containers and like articles in a single continuous operation from a sheet comprising a sheet support, a hollow shearing die carried by said sheet support, a lower mold aligned with said shearing die, an upper combustion chamber defining member movable down through said shearing die in cooperation therewith to shear a blank from a sheet and cooperable with the mold for clamping a blank therebetween, means for raising and lowering said combustion chamber defining member, and means for introducing a combustible gas mixture into said combustion chamber defining member, igniting the combustible gas mixture and exhausting the resultant gases of combustion in timed relation to the raising and lowering of said combustion chamber defining member.

16. The apparatus of claim 15 wherein said combustion chamber defining member is raised and lowered by a crankshft and said means include cams carried by said crankshaft.

17. The apparatus of claim 15 wherein said mold includes a fixed mold member, a sleeve slidable on said fixed mold member for movement with said combustion chamber defining member, and spring means resiliently supporting said sleeve and resisting downward movement thereof.

18. The apparatus of claim 15 wherein said means are connected to said combustion chamber defining member and include parts movable therewith.

19. An apparatus for forming from a sheet material blank hollow articles comprising a combustion chamber defining member having a flange, a mold having a flange mating with said combustion chamber defining member flange for clamping a blank therebetween, means mounting said combustion chamber defining member for movement towards and away from said mold in alignment with said mold, means connected to said combustion chamber defining member for supplying an explosive gas mixture thereto and igniting the same whereby shock waves caused by the explosion of the gas mixture will draw the blank from between said flanges and into said mold and shape the blank to conform to said mold.

20. The apparatus of claim 19 together with means resiliently mounting said mold for limited movement with said combustion chamber defining means whereby the clamping pressure of said flanges on a blank is controlled.

21. The apparatus of claim 19 together with ejection means carried in part by said mold and cooperating with said mold to eject a formed article therefrom.

22. The apparatus of claim 19 together with ejection means carried in part by said mold and cooperating with said mold to eject a formed article therefrom, said ejection means including an ejector pin having an end forming a portion of the bottom of said mold.

23. The apparatus of claim 19 wherein said mold is formed of split halves, and means are connected to said halves for automatically opening and closing said mold.

References Cited by the Examiner
UNITED STATES PATENTS

| | | | |
|---|---|---|---|
| 2,331,491 | 10/1943 | Menkin | 113—42 |
| 2,732,897 | 1/1956 | Musser | 113—44 |
| 2,843,070 | 7/1958 | Berkley et al. | 113—45 |
| 2,935,038 | 5/1960 | Chatten | 113—44 |
| 3,044,430 | 7/1962 | Zeigler | 113—44 |

FOREIGN PATENTS

| | | |
|---|---|---|
| 1,265,540 | 5/1961 | France. |
| 742,458 | 12/1958 | Great Britain. |

OTHER REFERENCES

High-Energy-Rate Metalworking Today: pages 61–68 of "The Tool and Manufacturing Engineer"; January 1962.

Advanced High Energy Rate Forming: Book II, book copyright 1962 by ASTME, article entitled, "Explosive Forming with Gas Mixtures," SP62-02 by Richard E. Lingen, article copyright 1962, pages 1–12.

CHARLES W. LANHAM, *Primary Examiner.*

WILLIAM J. STEPHENSON, *Examiner.*